United States Patent [19]

Pontoni

[11] 4,336,900
[45] Jun. 29, 1982

[54] ADJUSTABLE TAPE GUIDING METHOD AND APPARATUS

[75] Inventor: George E. Pontoni, La Habra, Calif.

[73] Assignee: Bell & Howell Company, Chicago, Ill.

[21] Appl. No.: 169,698

[22] Filed: Jul. 17, 1980

[51] Int. Cl.³ .................. B65H 17/32; G65H 23/32; G03B 1/50
[52] U.S. Cl. ............................ 226/97; 226/196; 226/199; 242/76
[58] Field of Search .......... 242/76, 55.19 A, 195–204, 242/206, 208–210; 226/7, 97, 180, 195, 196, 199

[56] References Cited

U.S. PATENT DOCUMENTS

| | | | |
|---|---|---|---|
| 1,672,846 | 6/1928 | Dalton | 226/171 X |
| 2,592,581 | 4/1952 | Lorig | 271/2.6 |
| 2,660,429 | 11/1953 | Lorig | 271/2.6 |
| 2,702,982 | 3/1955 | Guyot | 57/34 |
| 2,729,581 | 1/1956 | Pascoe | 154/2.7 |
| 2,862,715 | 12/1958 | MacDonald | 274/11 |
| 2,916,228 | 12/1959 | Wellington | 242/76 |
| 3,143,270 | 8/1964 | Cohen | 226/196 |
| 3,196,701 | 7/1965 | Morrow | 74/230.7 |
| 3,270,933 | 9/1966 | Dekker | 226/97 |
| 3,636,825 | 1/1972 | Randall et al. | 226/195 X |
| 3,726,588 | 4/1973 | Moser | 226/15 X |
| 3,799,422 | 3/1974 | Matsumoto | 226/196 |
| 4,017,897 | 4/1977 | Blanding | 360/85 |
| 4,091,422 | 5/1978 | Browder | 226/7 |

OTHER PUBLICATIONS

IBM Technical Disclosure Bulletin, vol. 10, No. 8, Jan. 1968, p. 1096, F. R. Hertrich.

Primary Examiner—Leonard D. Christian
Attorney, Agent, or Firm—Benoit Law Corporation

[57] ABSTRACT

An advancing tape is guided with a tape guide which is provided with a taper. The advancing tape is applied to the tape guide and a guiding force is imposed on the advancing tape with the aid of the taper. This guiding force is varied by adjusting the taper.

35 Claims, 2 Drawing Figures

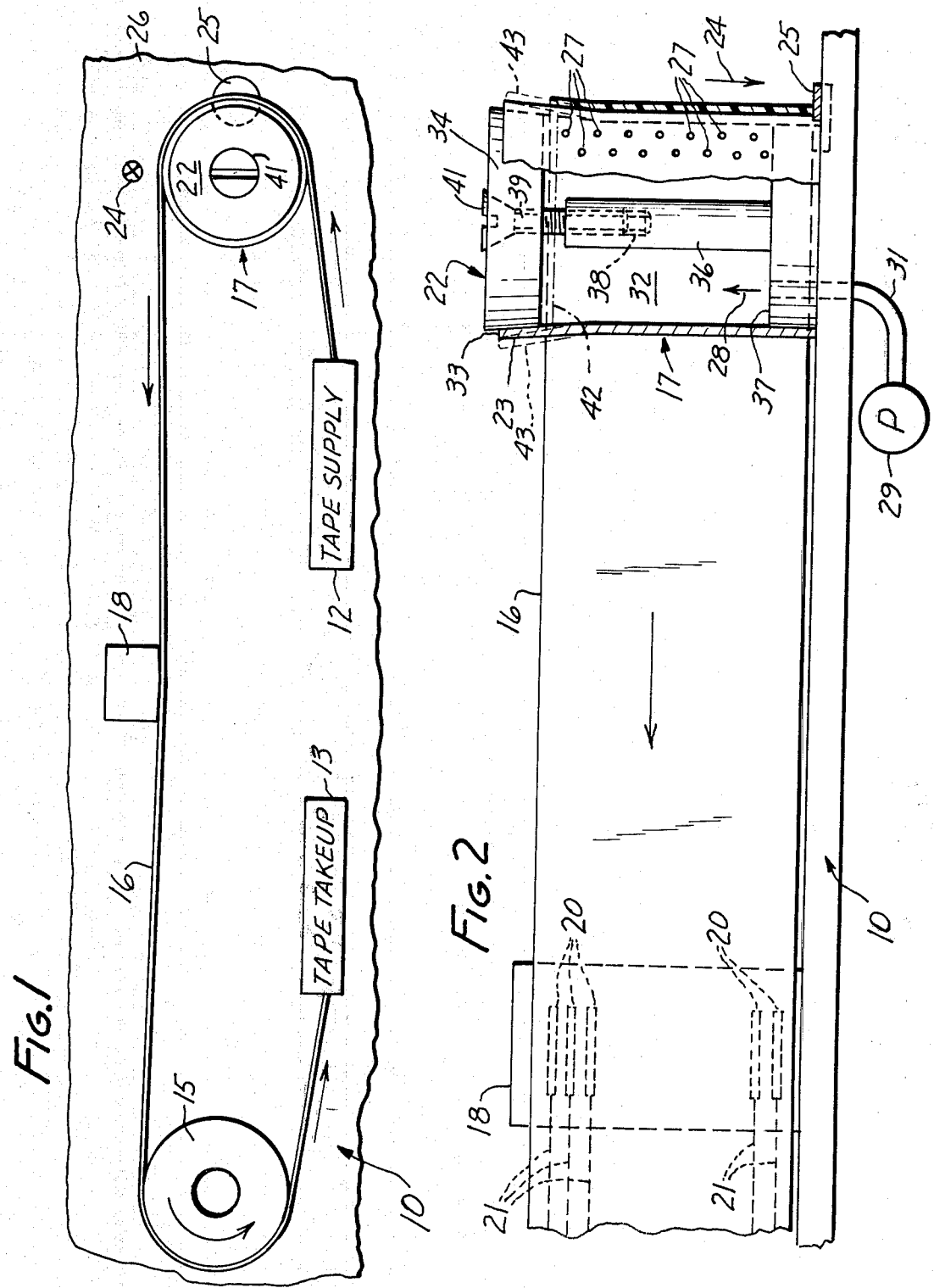

ADJUSTABLE TAPE GUIDING METHOD AND APPARATUS

BACKGROUND OF THE INVENTION

1. Field of the Invention

The subject invention relates to methods and apparatus for guiding a web of material or tape and to web and tape guides and, for instance, has utility in magnetic tape transports, photographic film handling apparatus and other tape or web transporting or handling equipment wherein precision guidance of a tape, film or other web is required or desired.

2. Disclosure Statement

This dislcosure statement is made pursuant to the duty of disclosure imposed by law and formulated in 37 CFR 1.56(a). No representation is hereby made that information thus disclosed in fact constitutes prior art, inasmuch as 37 CFR 1.56(a) relies on a materiality concept which depends on uncertain and inevitably subjective elements of substantial likelihood and reasonableness, and inasmuch as a growing attitude appears to require citation of material which might lead to a discovery of pertinent material though not necessarily being of itself pertinent. Also, the following comments contain conclusions and observations which have only been drawn or become apparent after conception of the subject invention or which contrast the subject invention or its merits against the background of developments subsequent in time or priority.

A large number of tape precision guiding techniques and apparatus have been proposed in the past. One repeatedly proposed tape guide has one or more tapers which urge an advancing web or tape against a reference edge or which center a web or tape, as may, for instance, be seen from U.S. Pat. No. 2,862,715, by D. N. MacDonald, issued Dec. 2, 1958, U.S. Pat. No. 2,916,228, by C. L. Wellington, issued Dec. 8, 1959, U.S. Pat. No. 3,143,270 by N. B. Cohen, issued Aug. 4, 1964, U.S. Pat. No. 3,636,825, by Randall et al, issued Jan. 25, 1972, U.S. Pat. No. 3,799,422, by R. Matsumoto, issued Mar. 26, 1974, U.S. Pat. No. 4,091,979, by L. B. Browder, issued May 30, 1978, and IBM Tedchnical Disclosure Bulletin, Vol. 10, No. 8, January 1968, p. 1096, including an article by F. R. Hertrich, entitled *Guiding Mechanism for Thin Tapes, Belts or Films*.

Reference may in this respect also be had to U.S. Pat. No. 1,672,846, by R. S. Dalton, issued June 5, 1928 and disclosing a tapered roller in a sheet conveyor and delivery mechanism.

In some automatic centering, guiding or rolling mechanisms, tapered rollers were made of or covered with elastic materials, as may, for instance, be seen from U.S. Pat. No. 2,592,581, by E. T. Lorig, issued Apr. 15, 1952, U.S. Pat. No. 2,660,429, by E. T. Lorig, issued Nov. 24, 1953, U.S. Pat. No. 2,729,581, by Pascoe et al, issued Jan. 3, 1956 and U.S. Pat. No. 3,196,701, by H. C. Morrow, issued July 27, 1965.

These known tapered guides lacked an agency for varying the guiding force acting on the advancing web or tape at will.

A steering roll having an elastomeric surface for supporting a web or belt is apparent from U.S. Pat. No. 3,726,588, by R. Moser, issued Apr. 10, 1973. According to that proposal, edgewise travel of the web or belt is controlled by bulging or tilting the elastomeric surface of the steering roll with applied fluid pressure.

In practice, that approach is generally limited to relatively coarse steering tasks, and is not considered suitable for high-precision web or tape guiding operations.

Existing proposals from other fields offer no remedy for such deficiencies. For instance, U.S. Pat. No. 2,702,982, by R. Guyot, issued Mar. 1, 1955, discloses filament winding and twisting apparatus employing yarn guide rollers with slanted soft flanges and using a yarn bobbin equipped with an elastic sleeve expanded by two frusto-conical flanges. After yarn has been wound on the bobbin, the flanges are removed, whereupon the sleeve contracts for separation from the wound yarn. That reference, however, fails to suggest any application of such lateral flaring principle to the guidance of any material.

U.S. Pat. No. 4,017,897, by D. L. Blanding, issued Apr. 12, 1977, discloses a tape guide which has a compound tapered configuration equipped with an angularly adjustable, washer-like ledge representing a helical edge adjacent the major diameter of the tapered guide. Inclination and vectorial direction of travel of the tape may be adjusted by angularly moving the contoured edge guide. That proposal thus merely adjusts a specially contoured tape edge guide, while providing a fixed taper. In practice, such adjustments are difficult to effect, requiring typically the use of both hands and a lot of guesswork, with imprecise results.

SUMMARY OF THE INVENTION

It is a general object of this invention to overcome the disadvantages and meet the needs expressed or implicit in the above disclosure statement or in other parts hereof.

It is a related object of this invention to provide improved methods and apparatus for guiding an advancing tape with a tape guide.

It is a germane object of this invention to provide improved tape guides.

It is also an object of this invention to provide improved methods and apparatus which permit adjustment of tape guiding forces at will.

It is a related object of this invention to provide improved tape transports and transporting methods.

Other objects of this invention will become apparent in the further course of this disclosure, wherein the expression "tape" frequently is employed generically for webs, belts, films, sheets and the like.

From a first aspect thereof, the subject invention resides in a method of guiding an advancing tape with a tape guide and, more specifically, resides in the improvement comprising in combination the steps of providing the tape guide with a continuously annular edge region having circumferentially an elasticity pursuant to Hooke's law and having a taper, applying the tape to the guide and imposing on the advancing tape a guiding force with the aid of the taper, and varying the guiding force by adjusting the taper through circumferential variation of said continuously annular edge region within said elasticity.

From another aspect thereof, the subject invention resides in a method of guiding an advancing tape and, more specifically, resides in the improvement comprising in combination the steps of providing a cylindrical tape guide with a continuously annular edge region having circumferentially an elasticity pursuant to Hooke's law, imposing a taper on an edge region of the cylindrical tape guide, applying the tape to the guide and imposing on the advancing tape a guiding force with the aid of the taper, and varying the guiding force by adjusting the taper through circumferential variation of said continuously annular edge region within said elasticity.

From another aspect thereof, the subject invention resides in apparatus for advancing a tape and, more specifically, resides in the improvement comprising, in combination, a tape guide having a continuously annular edge region having circumferentially an elasticity pursuant to Hooke's law and having a taper for imposing a guiding force on the tape, means for applying the advancing tape to the tape guide, and means connected to the tape guide for adjusting the taper to vary the guiding force through circumferential variation of said continuously annular edge region within said elasticity.

From another aspect thereof, the subject invention resides in apparatus for advancing a tape and, more specifically, resides in the improvement comprising, in combination, a hollow-cylindrical tape guide having a continuously annular edge region having circumferentially an elasticity pursuant to Hooke's law, a slanted member engaging said hollow-cylindrical tape guide at an edge region, means for applying the advancing tape to the tape guide, and means connected to the slanted member for providing the hollow-cylindrical tape guide with a taper at said edge region by forcing the slanted member into the edge region, whereby a circumferential variation of said continuously annular edge region is imposed thereon and guiding force is imposed on the tape.

From another aspect thereof, the subject invention resides in a tape guide comprising, in combination, means for providing a taper on the tape guide for imposing a guiding force on tape applied to the tape guide, including a continuously annular edge region having circumferentially an elasticity pursuant to Hooke's law and means connected to the tape guide for adjusting the taper to vary the guiding force through circumferential variation of said continuously annular edge region within said elasticity.

From another aspect thereof, the subject invention resides in a tape guide comprising, in combination, a hollow-cylindrical tape guide body having a continuously annular edge region having circumferentially an elasticity pursuant to Hooke's law, a slanted member engaging the hollow-cylindrical tape guide body at an edge region, and means connected to the slanted member for providing the hollow-cylindrical tape guide body with a taper at the edge region by forcing the slanted member onto the edge region, whereby a circumferential variation of said continuously annular edge region is imposed thereon and a guiding force is imposed on tape applied to the tape guide body.

BRIEF DESCRIPTION OF THE DRAWINGS

The subject invention and its various aspects and objects will become more readily apparent from the following detailed description of preferred embodiments thereof, illustrated by way of example in the accompanying drawings, in which like reference numerals designate like or functionally equivalent parts, and in which:

FIG. 1 is a diagrammatic top view of a tape transport and a tape guide according to a preferred embodiment of the subject invention; and FIG. 2 is an elevation, on an enlarged scale, of the tape transport and tape guide of FIG. 1.

DESCRIPTION OF PREFERRED EMBODIMENTS

The illustrated tape transport 10 includes a tape supply and a tape takeup mechanism, symbolically shown at 12 and 13 in FIG. 1. In practice, various tape supply and takeup mechanisms and arrangements may be employed at 12 and 13, and reference may in this respect be had to the above mentioned U.S. Pat. Nos. 2,862,715 and 4,091,979, herewith incorporated by reference herein.

According to conventional practice, the tape supply and takeup 12 and 13 may include loop formers and tape tension control equipment. In practice, the tape transport 10 may be bidirectional with the components 12 and 13 taking turns as tape supply and tape takeup agencies.

According to FIG. 1, a tape capstan 15, rotated by an appropriate drive motor (not shown), advances magnetic recording or other tape 16 from the tape supply 12 via a tape guide 17 and past a magnetic recording and playback head stack 18 towards the tape takeup 13.

The head stack 18 has a plurality of recording and playback heads, partially illustrated in dotted outlines 20, operating in a plurality of parallel recording tracks, symbolized by dotted lines 21 in FIG. 2. In practice, it is very important that recording and playback operations be exactly duplicated on the various recording tracks. In particular, each recording track 21 has to coincide exactly and fully with a playback head corresponding exactly to the recording head with which the data or other information in the particular recording track was recorded on the tape 16.

Several well-known factors, however, tend to militate against satisfaction of this requirement. For instance, without precision guidance, the tape will not exactly act the same during recording and playback. Also, practically all commercial tape is afflicted with a certain snakiness which manifests itself in deviations of tape edges from absolute straightness. Such snakiness is a consequence of commercial manufacturing operations and cannot in practice be entirely avoided. In fact, when several parallel tapes are cut simultaneously from a large width of tape, the individual tape sections inevitably will display different degrees of snakiness.

The effects of snakiness may practically be eliminated by a precision guidance system that continuously enforces an exact duplication of recording and playback operations, as far as individual track/head coincidence is concerned. The illustrated preferred embodiment of the subject invention provides such a guidance system and adds the feature of voluntary adjustability thereto.

In particular, the illustrated tape guide 17 has, or has means 22 for providing the tape guide with, a taper 23 for imposing a guiding force on the tape 16 applied to the tape guide 17.

As seen in FIGS. 1 and 2, the tape guiding force 24 acts downwardly toward a precision edge guide member 25. By way of example, the guide member may have a flat or level guide surface and may be in the form of a ceramic disc or other member of hard material. The tape guide disc 25 may be located at the foot of the tape guide 17 and may partially be sunk into the tape deck or baseplate 26.

In practice, one or more slanted or sloping tape edge guide members may be employed, and may be of the type disclosed in U.S. Pat. No. 4,267,951 by Frederic F. Grant and Henry M. Martija, issued May 19, 1981 to the subject assignee, and herewith incorporated by reference herein.

If desired, the tape guide 17 may be provided in the form of an air bearing, having peripheral apertures 27 supplied with air 28 by a pump 29 via a conduit 31 and the hollow interior 32 of the tape guide 17. The air film thus forming on the outer surface of the tape guide 17 acts as a lubricant for the advancing tape 16. Also, the taper 23 of the guide may cooperate with such air film in establishing a tape guiding force as described more fully in the above mentioned, incorporated U.S. Pat. No. 4,091,979.

According to the subject invention, the tape guiding force 24 is varied by adjusting the taper 23. This may, in accordance with the illustrated embodiment, be accomplished with the aid of the means 22 for providing the taper 23 in the first place.

According to embodiments of the subject invention, the guiding force 24 may be varied by varying the taper 23 in inclination. By way of example, the taper may be provided with a curvature, and the guiding force may be varied by varying the taper as to degree of curvature.

According to the illustrated embodiment of the subject invention, the tape guide is or is made of cylindrical, and preferably hollow-cylindrical, configuration. The adjusting means 22 preferably impose the taper 23 on an edge region 33 of the tape guide, and the guiding force 24, with which the advancing tape 16 is applied to the edge guide 25, is preferably varied by adjusting the imposed taper 23 at the edge region 33.

Further according to the illustrated preferred embodiment of the invention, the taper 23 is provided by forcing a slanted member 34 onto or into an edge region 33 of the hollow-cylindrical tape guide 17. The tape guiding force 24 may be increased for forcing the slanted member 34 into the edge region and/or the guiding force may be lessened by releasing the slanted member 34 relative to the edge region 33 of the hollow-cylindrical tape guide 17.

As seen in FIG. 2, the slanted member 34, engaging the hollow-cylindrical tape guide at edge region 33, may be in the form of a disc having a frusto-conical rim portion engaging the hollow cylindrical tape guide at the edge region 33. A central post 36 may extend axially in the hollow-cylindrical tape guide 17 from a base 37 which, in turn, is attached to the tape deck 26 and circumferentially carries the peripheral wall of the tape guide.

The central post 36 stops short of the edge region 36 of the tape guide and has an internally threaded axial bore 38 for receiving a tensioning bolt or screw 39 extending through the slanted disc 34 and having a head 41 in force-transmitting engagement therewith. Depending on the nature of the bolt 39, a screw driver or socket wrench may be employed for tightening and loosening the bolt 39 relative to the central post 36. In particular, the bolt 39 may be tightened into the post 36 for forcing the disc 34 downwardly, as shown in dotted outline at 42 and for increasing the taper 23, as shown in dotted outline at 43, for an adjustment of the transverse tape guiding force 24 in a first sense.

Conversely, the bolt 39 may be loosened or untightened relative to the central post 36 for an upward movement of the frusto-conical disc 34 under the inherent resiliency of the edge region 33, and for a consequential diminution of the taper 23 and adjustment of the transverse tape guiding force in an opposite sense.

In this respect, the slant of the taper providing disc 34 is dimensioned with respect to the coefficient of friction between the edge region 33 and periphery of disc 34 to avoid sticking of the disc on the edge region during normal operation of the taper providing function. Also, the hollow-cylindrical tape guide 17 is dimensioned so that the material in the edge region 33 remains within its limits of elasticity under Hooke's law during all phases of operation of the taper adjusting device 22. As seen in FIG. 1 with the aid of FIG. 2, the tape guide 17 has or is provided with a continuously annular edge region 33, and as indicated in the preceding sentence, the edge region 33 has an elasticity pursuant to Hooke's law which, in this case of a continuously annular edge region 33 acts circumferentially thereof. As seen in FIG. 2 with the aid of FIG. 1, the tape guiding force 24 is varied by adjusting the taper 23 through circumferential variation of the continuously annular edge region 33.

In practice, the taper 23 and thus the transverse tape guiding force 24 will be set at optimum value at the factory by adjustment of the bolt 39 under rigid test conditions. In many instances, this may be the only taper adjustment necessary for the particular tape transport. However, the taper 23 may also be adjusted during overhaul operations or, for that matter, as desired or necessary in the operation of the tape transport.

It will now be recognized that the subject invention meets its initially stated objectives and overcomes the above mentioned disadvantages of prior devices, thereby providing in a broader sense adjustable transverse guiding forces on all kinds of advancing tapes, webs, belts, and other sheet-like stock.

The subject invention in particular enables stepless adjustment of a transverse tape guiding force to optimum value, whereby the tape is gently urged against a tape edge guide without curling of the tape on the one hand and separation of tape and edge guide on the other. Also, the invention enables an adjustment that can be easily effected with a single tool, without any manipulation of tape guide elements themselves being necessary.

Moreover, the subject extensive disclosure and its logical extensions will suggest and render apparent to those skilled in the art various modifications and variations within the spirit and scope of the subject invention.

I claim:

1. In a method of guiding an advancing tape with a tape guide, the improvement comprising in combination the steps of:
    providing said tape guide with a continuously annular edge region having circumferentially an elasticity pursuant to Hooke's law and having a taper;
    applying said tape to said guide and imposing on said advancing tape a guiding force with the aid of said taper; and
    varying said guiding force by adjusting said taper through circumferential variation of said continuously annular edge region within said elasticity.

2. A method as claimed in claim 1, wherein:
    said guiding force is varied by varying said taper in inclination.

3. A method as claimed in claim 1, wherein:
    said taper is provided with a curvature; and
    said guiding force is varied by varying said taper as to degree of curvature.

4. A method as claimed in claim 1, 2 or 3, including the steps of:

providing an edge guide for said tape; and
applying said advancing tape to said edge guide with said guiding force.

5. A method as claimed in claim 1, 2 or 3, including the step of:
providing an air film between said advancing tape and said guide.

6. A method as claimed in claim 5, including the steps of:
providing an edge guide for said tape; and
applying said advancing tape to said edge guide with said guiding force.

7. In a method of guiding an advancing tape, the improvement comprising in combination the steps of:
providing a cylindrical tape guide with a continuously annular edge region having circumferentially an elasticity pursuant to Hooke's law;
imposing a taper on an edge region of said cyindrical tape guide;
applying said tape to said guide and imposing on said advancing tape a guiding force with the aid of said taper; and
varying said guiding force by adjusting said taper through circumferential variation of said continuously annular edge region within said elasticity.

8. A method as claimed in claim 7, wherein:
said tape guide is made hollow-cylindrical; and
said taper is provided by forcing a slanted member into an edge region of said hollow-cylindrical tape guide.

9. A method as claimed in claim 8, wherein:
said guiding force is increased by forcing said slanted member into said edge region of the hollow-cylindrical tape guide.

10. A method as claimed in claim 8, wherein:
said guiding force is lessened by releasing said slanted member relative to said edge region of the hollow-cylindrical tape guide.

11. A method as claimed in claim 7, 8, 9 or 10, including the steps of:
providing an edge guide for said tape; and
applying said advancing tape to said edge guide with said guiding force.

12. A method as claimed in claim 7, 8, 9 or 10, including the step of:
providing an air film between said advancing tape and said guide.

13. A method as claimed in claim 12, including the steps of:
providing an edge guide for said tape; and
applying said advancing tape to said edge guide with said guiding force.

14. In apparatus for advancing a tape, the improvement comprising in combination:
a tape guide having a continuously annular edge region having circumferentially an elasticity pursuant to Hooke's law and having a taper for imposing a guiding force on said tape;
means for applying said advancing tape to said tape guide; and
means connected to said tape guide for adjusting said taper to vary said guiding force through circumferential variation of said continuously annular edge region within said elasticity.

15. Apparatus as claimed in claim 14, wherein:
said adjusting means include means for varying said taper in inclination.

16. Apparatus as claimed in claim 14, wherein:
said taper has a curvature; and
said adjusting means include means for varying said taper as to degree of curvature.

17. Apparatus as claimed in claim 14, wherein:
said tape guide is cylindrical; and
said adjusting means include means for imposing said taper on an edge region of said cylindrical tape guide.

18. Apparatus as claimed in claim 17, wherein:
said adjusting means include means for varying said guiding force by adjusting said imposed taper at said edge region.

19. In apparatus for advancing a tape, the improvement comprising in combination:
a hollow-cylindrical tape guide having a continuously annular edge region having circumferentially an elasticity pursuant to Hooke's law;
a slanted member engaging said hollow-cylindrical tape guide at an edge region;
means for applying said advancing tape to said tape guide; and
means connected to said slanted member for providing said hollow-cylindrical tape guide with a taper at said edge region by forcing said slanted member into said edge region, whereby a circumferential variation of said continuously annular edge region is imposed thereon and a force is imposed on said tape.

20. Apparatus as claimed in claim 19, wherein:
said taper providing means include means for adjusting said taper by varying said slanted member in position relative to said hollow-cylindrical tape guide.

21. Apparatus as claimed in claim 19, wherein:
said taper providing means include means for providing an increasing guiding force on said tape by increasingly forcing said slanted member into said hollow-cylindrical guide.

22. Apparatus as claimed in claim 19, wherein:
said slanted member is a disc having a frusto-conical rim portion engaging said hollow-cylindrical tape guide at said edge region.

23. Apparatus as claimed in claim 14, 15, 16, 17, 18, 19, 20, 21 or 22, including:
an edge guide for said tape; and
means for positioning said edge guide for application of said tape to said edge guide with said guiding force.

24. Apparatus as claimed in claim 14, 15, 16, 17, 18, 19, 20, 21 or 22, including:
means connected to said tape guide for providing an air film between said tape and said guide.

25. Apparatus as claimed in claim 24, including:
an edge guide for said tape; and
means for positioning said edge guide for application of said tape to said edge guide with said guiding force.

26. A tape guide comprising in combination:
means for providing a taper on said tape guide for imposing a guiding force on tape applied to said tape guide, including a continuously annular edge region having circumferentially an elasticity pursuant to Hooke's law;
means connected to said tape guide for adjusting said taper to vary said guiding force through circumferential variation of said continuously annular edge region within said elasticity.

27. A tape guide as claimed in claim 26, wherein:

said adjusting means include means for varying said taper in inclination.

28. A tape guide as claimed in claim 26, wherein:
said taper has a curvature; and
said adjusting means include means for varying said taper as to degree of curvature.

29. A tape guide as claimed in claim 26, wherein:
said tape guide is cylindrical; and
said adjusting means include means for imposing said taper on an edge region of said cylindrical tape guide.

30. A tape guide as claimed in claim 29, wherein:
said adjusting means include means for varying said guiding force by adjusting said imposed taper at said edge region.

31. A tape guide comprising in combination:
a hollow-cylindrical tape guide body having a continuously annular edge region having circumferentially an elasticity pursuant to Hooke's law;
a slanted member engaging said hollow-cylindrical tape guide body at an edge region; and
means connected to said slanted member for providing said hollow-cylindrical tape guide body with a taper at said edge region by forcing said slanted member onto said edge region, whereby a circumferential variation of said continuously annular edge region is imposed thereon and a guiding force is imposed on tape applied to said tape guide body.

32. A tape guide as claimed in claim 31, wherein:
said taper providing means include means for adjusting said taper by varying said slanted member in position relative to said hollow-cylindrical tape guide body.

33. A tape guide as claimed in claim 31, wherein:
said taper providing means include means for providing an increasing guiding force on said tape by increasingly forcing said slanted member into said hollow-cylindrical tape guide body.

34. A tape guide as claimed in claim 31, wherein:
said slanted member is a disc having a frusto-conical rim portion engaging said hollow-cylindrical tape guide body at said edge region.

35. A tape guide as claimed in claim 26, 27, 28, 29, 30, 31, 32, 33 or 34, including:
means connected to said tape guide body for providing an air film between said tape and said tape guide body.

* * * * *